(12) United States Patent
Kottaru et al.

(10) Patent No.: US 10,967,353 B2
(45) Date of Patent: Apr. 6, 2021

(54) FLUID REGULATION APPARATUS AND METHOD

(71) Applicant: United EE, LLC, Buffalo Grove, IL (US)

(72) Inventors: Venu Dikshitulu Kottaru, Hyderabad (IN); Srinivas Paspulla, Chicago, IL (US)

(73) Assignee: United EE, LLC, Chicago, IL (US)

( * ) Notice: Subject to any disclaimer, the term of this patent is extended or adjusted under 35 U.S.C. 154(b) by 136 days.

(21) Appl. No.: 16/161,181

(22) Filed: Oct. 16, 2018

(65) Prior Publication Data

US 2019/0046942 A1 Feb. 14, 2019

Related U.S. Application Data

(63) Continuation of application No. 16/159,272, filed on Oct. 12, 2018.

(51) Int. Cl.
| | |
|---|---|
| *B01J 19/02* | (2006.01) |
| *B01J 19/00* | (2006.01) |
| *B01J 4/02* | (2006.01) |
| *C10L 1/188* | (2006.01) |
| *C10L 1/182* | (2006.01) |
| *C10L 1/185* | (2006.01) |

(Continued)

(52) U.S. Cl.
CPC ............ *B01J 19/0033* (2013.01); *B01J 4/02* (2013.01); *C10L 1/02* (2013.01); *C10L 1/1608* (2013.01); *C10L 1/182* (2013.01); *C10L 1/1824* (2013.01); *C10L 1/1826* (2013.01); *C10L 1/1852* (2013.01); *C10L 1/1857* (2013.01); *C10L 1/1881* (2013.01); *B01J 2219/00162* (2013.01); *B01J 2219/00164* (2013.01); *B01J 2219/00186* (2013.01); *B01J 2219/00189* (2013.01); *B01J 2219/00195* (2013.01); *C10L 2230/22* (2013.01); *C10L 2290/56* (2013.01); *C10L 2290/58* (2013.01)

(58) Field of Classification Search
CPC ............... B01J 19/0033; B01J 4/02; B01J 2219/00195; B01J 2219/00164; B01J 2219/00162; B01J 2219/00186; B01J 2219/00189

See application file for complete search history.

(56) References Cited

U.S. PATENT DOCUMENTS 3,304,007 A * 2/1967 Hruby, Jr. ............. F04D 29/466
                                                              239/23
3,617,403 A    11/1971 Johnson
(Continued)

FOREIGN PATENT DOCUMENTS

CN        1087767 C     7/2002
CN      101392201 A     3/2009
(Continued)

*Primary Examiner* — Cephia D Toomer
(74) *Attorney, Agent, or Firm* — Nyman IP LLC; Scott Nyman

(57) ABSTRACT

A fuel composition and fluid regulation apparatus are provided for an improved fuel composition and distribution. The fuel composition may include or relate to a fluid regulation apparatus, flow component, electronic controller, regulator covers, roller clip mechanism, filling head, feeder stem and distributor. A method to operate an improved fuel composition and/or fluid regulation apparatus is also provided.

20 Claims, 9 Drawing Sheets

(51) Int. Cl.
*C10L 1/02* (2006.01)
*C10L 1/16* (2006.01)

(56) References Cited

U.S. PATENT DOCUMENTS

| | | |
|---|---|---|
| 3,643,403 A | 2/1972 | Speece |
| 4,202,385 A | 5/1980 | Voelz |
| 4,606,841 A | 8/1986 | Basu |
| 4,729,769 A | 3/1988 | Schlicht |
| 5,984,984 A | 11/1999 | Ahmed |
| 5,996,977 A | 12/1999 | Burgess |
| 6,019,114 A | 2/2000 | Rodgers |
| 9,340,737 B2 | 5/2016 | Moreno |
| 2006/0052903 A1 | 3/2006 | Bassett |
| 2008/0068920 A1 | 3/2008 | Galliher |
| 2019/0046942 A1 | 2/2019 | Gaffoor |

FOREIGN PATENT DOCUMENTS

| | | | |
|---|---|---|---|
| JP | S5549513 | * | 4/1980 |
| WO | WO8404388 | * | 11/1984 |

\* cited by examiner

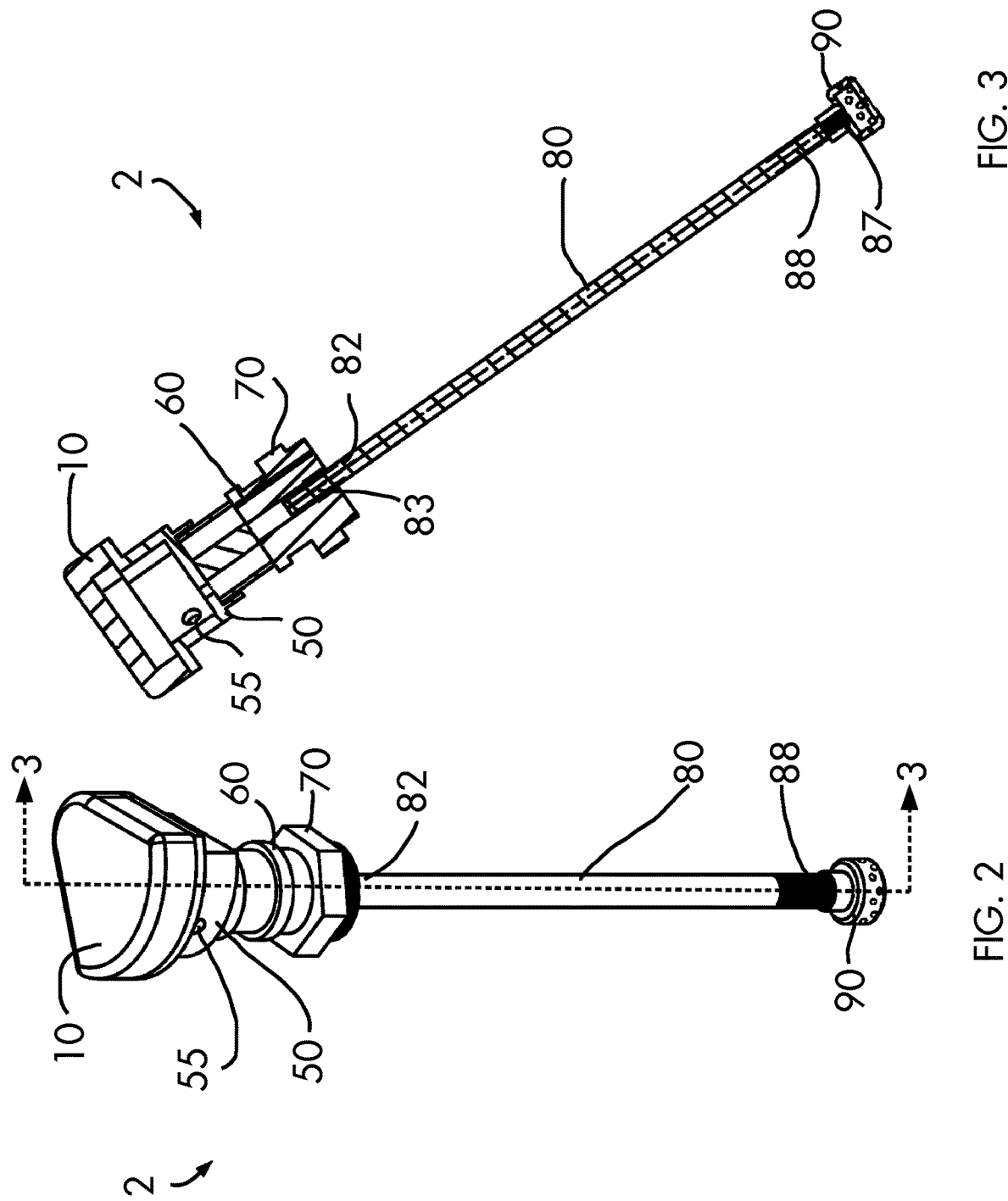

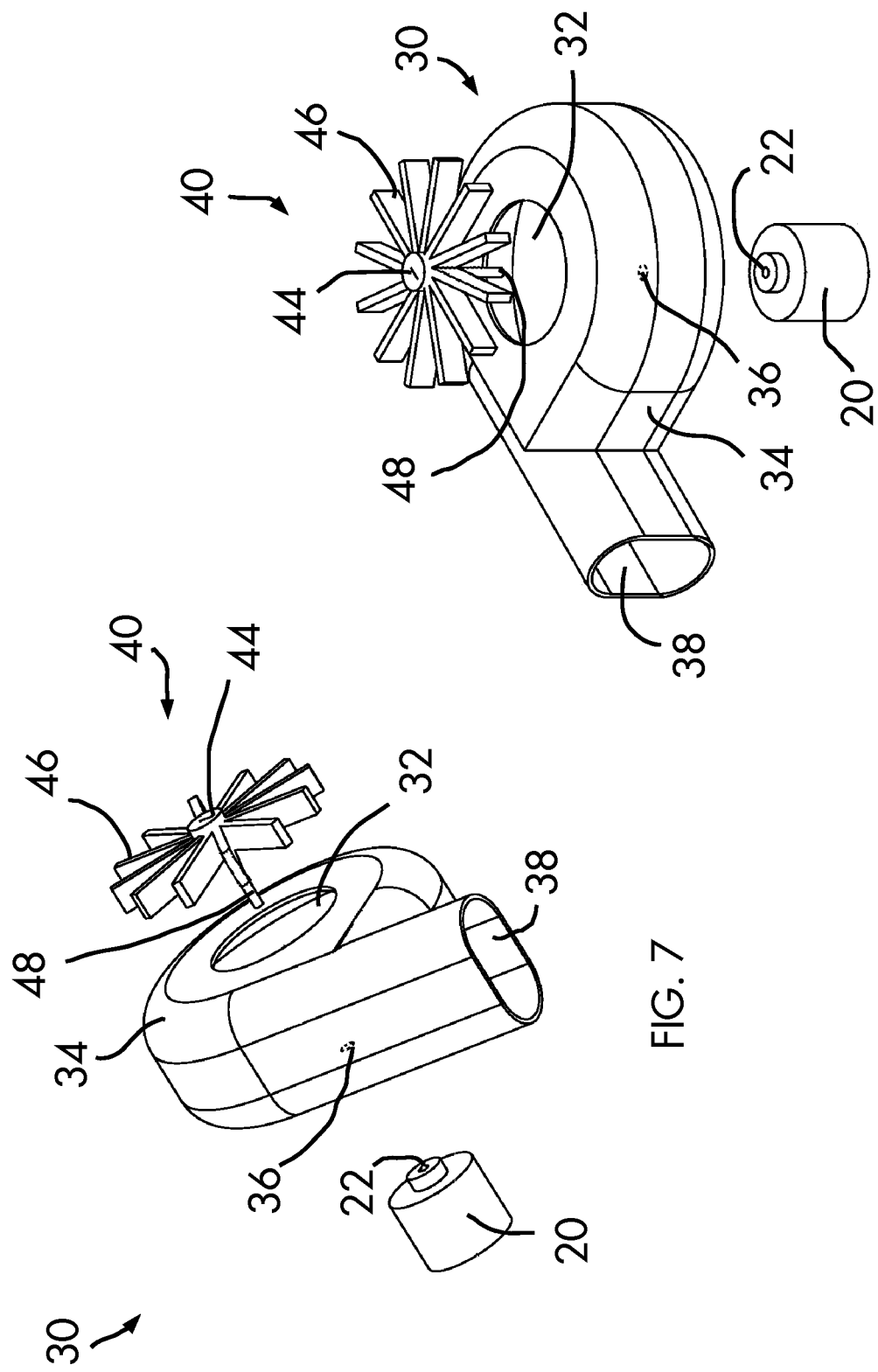

FLUID REGULATION APPARATUS AND METHOD

CROSS-REFERENCE TO RELATED APPLICATION

This application is a continuing application of, and claims priority from, U.S. nonprovisional utility patent application Ser. No. 16/159,272 filed Oct. 12, 2018 and titled "FUEL COMPOSITION". The foregoing application is incorporated in its entirety herein by reference.

FIELD OF THE INVENTION

The present disclosure relates to a fuel composition. More particularly, the disclosure relates to providing an improved fuel composition.

BACKGROUND

Our world is reliant on combustible fuels. Common types of fuels include crude petroleum, liquefied petroleum gas (LPG), diesel, gasoline, propane, kerosene, butane, natural gas, and other flammable fluids. Burning of fuels can be used to provide heat for cooking, power generation, heating of a space, locomotion, industrial applications, kilns, furnaces, forges, and other applications used throughout history.

However, many of the most widely used petroleum gases and equivalents are not economical and pose substantial risk of unintended combustion or explosion. Improper handling of existing petroleum fuel sources can cause catastrophic failure. Even slight exposure to an open flame can have disastrous results. Additional risks inherent to existing fuel sources are the chance of rupturing a container holding the fuel source, which may result in an explosion or other catastrophic failure. Furthermore, commonly used petroleum gases are considered "wet" gases and can contribute to air pollution.

Therefore, a need exists to solve the deficiencies present in the prior art. What is needed is an improved fuel composition with increased usability. What is needed is an improved fuel composition with improved safety characteristics. What is needed is a method for producing an improved fuel composition. What is needed is a fluid regulation apparatus to extract improved vapors from improved fuel compositions. What is needed is a fluid regulation apparatus to agitate a fuel composition for extraction of vapors. What is needed is a method of extracting vapors using an improved fluid regulation apparatus.

SUMMARY

An aspect of the disclosure advantageously provides an improved fuel composition with increased usability. An aspect of the disclosure advantageously provides an improved fuel composition with improved safety characteristics. An aspect of the disclosure advantageously provides a method for producing an improved fuel composition. An aspect of the disclosure advantageously provides a fluid regulation apparatus to extract improved vapors from improved fuel compositions. An aspect of the disclosure advantageously provides a fluid regulation apparatus to agitate a fuel composition for extraction of vapors. An aspect of the disclosure advantageously provides a method of extracting vapors using an improved fluid regulation apparatus.

Accordingly, the disclosure may feature a combustible composition that may include an alkane and a primary organic compound that may include a carbonyl group. The alkane may be a majority of the composition.

In another aspect, the alkane may include six carbon atoms.

In another aspect, the alkane may be hexane.

In another aspect, the primary organic compound may have a lower boiling point than the alkane.

In another aspect, the primary organic compound may be a ketone.

In another aspect, the ketone may be symmetrical.

In another aspect, the ketone may be acetone.

In another aspect, an additive organic compound may be included.

In another aspect, the additive organic compound may include a hexadecenoic acid.

In another aspect, the additive organic compound may include a dimethyl ether or an alcohol.

In another aspect, the additive organic compound may include an alcohol comprising ethanol.

In another aspect, the composition may have a composition specific gravity approximately half of a water specific gravity.

In another aspect, the composition may have a composition viscosity approximately one tenth of a water viscosity.

According to at least one embodiment, a combustible composition may be provided including an alkane comprising six carbon atoms and a ketone. The ketone may have a lower boiling point than the alkane. The alkane may be a majority of the composition.

In another aspect, the alkane may be hexane.

In another aspect, the ketone may be acetone.

In another aspect, a hexadecenoic acid and/or an alcohol may be included.

In another aspect, the composition may have a composition specific gravity approximately half of a water specific gravity and a composition viscosity approximately one tenth of a water viscosity.

According to at least one embodiment, a combustible composition may be provided including hexane being a majority of the composition and acetone.

In another aspect, the composition may additionally include an additive organic compound comprising a hexadecenoic acid and/or an alcohol.

Accordingly, the disclosure may additionally provide a fluid regulation apparatus including an impeller located substantially within an interior volume of a flow component, a motor operatively connected to the impeller via an impeller shaft to rotate the impeller, an electronic controller to affect operation of the motor by analyzing a condition detected by a sensor operatively connected to the electronic controller, a regulator outlet aperture, a feeder stem installable to a container to direct a gas expelled from the flow component, and a distributor operatively connected to the feeder stem to distribute the gas received from the feeder stem.

In another aspect, the fluid regulation apparatus further include a regulator top cover and a regulator bottom cover. The flow component may be at least partially enclosed by the regulator top cover and the regulator bottom cover.

In another aspect, the fluid regulation apparatus further include a filling head operatively connected to the feeder stem and installable to the container.

In another aspect, a roller clip mechanism connectable to the filling head may be included. The gas expelled from the flow component may be passable between the roller clip mechanism that is connected to the filling head and the filling head.

In another aspect, the feeder stem may include a feeder stem top end for installation to the filling head and a feeder stem bottom end distal to the feeder stem top end for installation to the distributor. The gas may pass through the feeder stem between the filling head and the distributor.

In another aspect, the feeder stem top end may include a feeder stem top threading. The feeder stem bottom end may include a feeder stem bottom threading. The filling head may include a filling head inner threading to at least partially receive the feeder stem via the feeder stem top threading. The distributor may include a distributor inner threading to at least partially receive the feeder stem via the feeder stem bottom threading.

In another aspect, the electronic controller may affect the operation of the motor via: (1) accessing a target pressure stored in a memory of the electronic controller to define a rule; (2) determining via the sensor a detected pressure within the container; (3) comparing the detected pressure with the target pressure to determine compliance with the rule; (4) enabling the motor for the detected pressure not substantially in compliance with the rule; and (5) disabling the motor for the detected pressure substantially in compliance with the rule.

In another aspect, the distributor may be at least partially submergible into a fluid within the container when installed to the container. The gas flowed through the distributor may at least partially agitate the fluid.

In another aspect, agitation of the fluid may incite a chemical reaction to create a vapor from the fluid. The vapor may be extracted from the container via the regulator outlet aperture.

In another aspect, a valve may be included to control flow of the vapor from the regulator outlet aperture.

In another aspect, the valve may be a triple non-return valve.

In another aspect, the electronic controller may be at least partially powered by a battery.

In another aspect, the battery may be at least partially charged by converting kinetic energy of the vapor into electrical energy storable in the battery.

According to at least one embodiment of this disclosure, a fluid regulation apparatus may be provided including an impeller located substantially within an interior volume of a flow component, a motor operatively connected to the impeller via an impeller shaft to rotate the impeller, and an electronic controller to affect operation of the motor by analyzing a condition detected by a sensor operatively connected to the electronic controller. The electronic controller may affect the operation of the motor via: (a) accessing a target pressure stored in a memory of the electronic controller to define a rule; (b) determining via the sensor a detected pressure within a container; (c) comparing the detected pressure with the target pressure to determine compliance with the rule; (d) enabling the motor for the detected pressure not substantially in compliance with the rule; and (e) disabling the motor for the detected pressure substantially in compliance with the rule.

In another aspect, a feeder stem may be included and installable to the container to direct a gas expelled from the flow component. A distributor may be operatively connected to the feeder stem to distribute the gas received from the feeder stem. A filling head may be operatively connected to the feeder stem and installable to the container. A roller clip (cache) mechanism may be connectable to the filling head. The gas expelled from the flow component may be passable between the roller clip mechanism that is connected to the filling head and the filling head.

In another aspect, the distributor may be at least partially submerged or submersible into a fluid within the container when installed to the container. The gas flowed through the distributor may at least partially agitate the fluid. Agitation of the fluid may incite a chemical reaction to create a vapor from the fluid. The vapor may be extracted from the container via the regulator outlet aperture. A valve may be included to control flow of the vapor from the regulator outlet aperture.

In another aspect, the electronic controller may be at least partially powered by a battery. The battery may be at least partially charged by converting kinetic energy of the vapor into electrical energy storable in the battery.

According to at least one embodiment of the disclosure, a method may be provided for controlling creation of a vapor using a fluid regulation apparatus. The method may include: (a) installing the fluid regulation apparatus to a container, the fluid regulation apparatus including an impeller located substantially within an interior volume of a flow component, a motor operatively connected to the impeller via an impeller shaft to rotate the impeller, an electronic controller to affect operation of the motor by analyzing a condition detected by a sensor operatively connected to the electronic controller, a regulator outlet aperture, a feeder stem installable to a container to direct a gas expelled from the flow component, and a distributor operatively connected to the feeder stem to distribute the gas received from the feeder stem. The method may also include (b) affecting operation of the motor via the electronic controller by performing the steps: (i) accessing a target pressure stored in a memory of the electronic controller to define a rule, (ii) determining via the sensor a detected pressure within the container, (iii) comparing the detected pressure with the target pressure to determine compliance with the rule, (iv) enabling the motor for the detected pressure not substantially in compliance with the rule, and (v) disabling the motor for the detected pressure substantially in compliance with the rule. The method may also include (c) if the motor is enabled, flowing the gas through the distributor to at least partially agitate the fluid. The method may also include (d) inciting a chemical reaction to create a vapor from the fluid via the agitation. The method may also include (e) extracting the vapor from the container via the regulator outlet aperture.

In another aspect, the method may include (f) controlling flow of the vapor from the regulator outlet aperture via a valve.

In another aspect, the method may include (g) at least partially powering the electronic controller by a battery; and (f) at least partially converting kinetic energy of the vapor into electrical energy storable in the battery.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

BRIEF DESCRIPTION OF THE DRAWINGS

FIG. 2 is a perspective view of a fluid regulation apparatus, according to an embodiment of this disclosure.

FIG. 3 is a sectional view of a fluid regulation apparatus, according to an embodiment of this disclosure.

FIGS. 7-8 are perspective views of a flow component, according to an embodiment of this disclosure.

DETAILED DESCRIPTION

Figure 1:
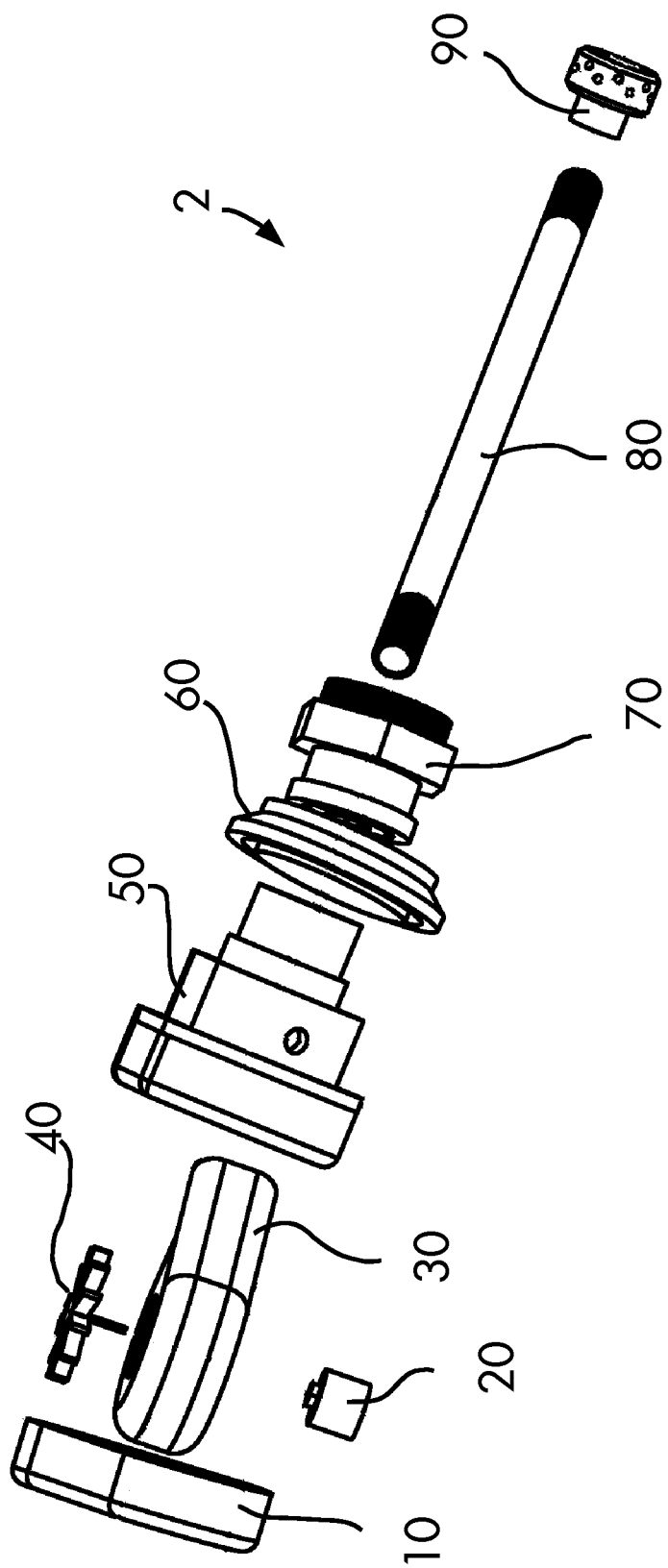
FIG. 1 is an exploded view of a fluid regulation apparatus, according to an embodiment of this disclosure.

The following disclosure is provided to describe various embodiments of a fuel composition. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, a fuel composition will be discussed. Those of skill in the art will appreciate alternative labeling of the fuel composition as a heating fluid, fuel source, regulator, gas system, the invention, or other similar names. Similarly, those of skill in the art will appreciate alternative labeling of the fuel composition as a fuel vaporization and combustion method, fuel delivery technique, fuel regulation, active regulation for fuel compositions, fuel techniques, method, operation, the invention, or other similar names. Skilled readers should not view the inclusion of any alternative labels as limiting in any way.

Referring now to FIGS. 1-22, the fuel composition will now be discussed in more detail. The fuel composition may include a fuel, fluid regulation apparatus, flow component, electronic controller, regulator covers, roller clip mechanism, filling head, feeder stem, distributor, and additional components that will be discussed in greater detail below. The fuel composition may operate one or more of these components interactively with other components to provide an improved fuel composition.

The fuel composition will now be discussed in greater detail. A fuel composition enabled by this disclosure may include one or more products in the hydrocarbon family of compounds. For example, a fuel composition enabled by this disclosure may include a combination of carbon and hydrogen atoms of varying molecular structures.

In at least one embodiment, a component of the fuel composition may include an alkane, which can be an acyclic saturated hydrocarbon. As would be appreciated by those of skill in the art, an alkane may include combinations of hydrogen and carbon atoms arranged in a tree-like structure with carbon-carbon bonds that are singular. While some alkanes will be described in greater detail throughout this disclosure, skilled artisans will appreciate that use of other alkanes are intended to be included by and within the scope and spirit of this disclosure. Alkanes are additionally characterized by their carbon skeleton or carbon backbone, which may provide a series of linked carbon atoms that may include hydrogen atoms attached to one or more of the carbon atoms in the carbon backbone.

For the purpose of this disclosure, alkanes are intended to include the International Union of Pure and Applied Chemistry (IUPAC) definition of alkanes as acyclic branched or unbranded hydrocarbons have the general formula of:

$$C_nH_{2n+2}$$

Additionally, for the purpose of this disclosure, alkanes are intended to include the additional saturated hydrocarbons, including monocyclic and/or polycyclic hydrocarbons. An illustrative general formula of the additional saturated hydrocarbons to be included as alkanes by this disclosure includes:

$$C_nH_{2n}$$

In at least one embodiment of a fuel composition enabled by this disclosure, the alkane may include at least six carbon atoms in its molecular structure. Additional atoms or molecules may be bonded with one or more of the carbon atoms in the alkane, for example, hydrogen or other atoms and/or molecules.

In one example, and provided without limitation, the alkane may be or include hexane. Hexane will be appreciated by those of skill in the art to include a carbon backbone of six carbon atoms and an array of hydrogen atoms bonded to each of the carbon atoms in the carbon backbone. An illustrative formula for hexane includes:

$$C_6H_{14}$$

Use of hexane may be advantageous due to its substantially colorless and odorless properties, desirable boiling points between about 50° C. and 70° C., and energy density. Additionally, hexane may be advantageous due to its low cost to produce, considerably unreactive properties, improved safety for use and transport, and usability.

The fuel composition may additionally include a primary organic compound. For the purpose of this disclosure, organic compounds are intended to include generally any chemical compound that includes at least one carbon atom. Those of skill in the arts of chemistry and organic chemistry will appreciate the types of compounds and compositions that may be included in this group of organic compounds. In at least one embodiment, the primary organic compounds may be characterized with a lower boiling point than the alkane.

In at least one embodiment, the primary organic compound may include a carbonyl group. For the purpose of this disclosure, a carbonyl group is intended to describe a functional group including at least one carbon atom and an oxygen atom. The carbon atom may be double bonded to the oxygen atom. In some embodiments, the additional atoms or compounds bonded to the carbon atom may be symmetrical.

In at least one embodiment, the primary organic compound may be a ketone. For the purpose of this disclosure, a ketone is intended to describe an organic structure that includes a carbonyl group and additional atoms or compositions bonded to the carbon of the carbonyl group. The ketone may be symmetrical. Additionally, the ketone may include nonreactive groups attached to the carbon atom of the carbonyl group. Those skilled in the art will further appreciate the nature of ketones and their usefulness in a fuel composition after having the benefit of this disclosure.

In at least one embodiment, the primary organic compound may be acetone. For the purpose of this disclosure, acetone is intended to describe a chemical composition structured as a simple ketone. Acetone may include a carbonyl group bonded with two additional carbons, each of which are bonded with three hydrogens. Skilled artisans will appreciate that acetone may be alternatively called Propan-2-one under IUPAC standards. An illustrative formula for acetone as the primary organic compound may be:

$$(CH_3)_2CO$$

The fuel composition may include one or more additive compounds. The additive compounds may be or include an additive organic compound.

For example, the additive organic compound of the fuel composition may include a hexadecenoic acid. For the purpose of this disclosure, a hexadecenoic acid is intended to describe a monounsaturated fatty acid. Alternatively, the hexadecenoic acid may be referred to as a palmitoleic acid. Hexadecenoic acid may be derived from animal fats, vegetable oils, marine oils, or other sources. In at least one embodiment, the hexadecenoic acid may be and omega-7 monounsaturated fatty acid, which may be described by the formula:

$$CH_3(CH_2)_5CH=CH(CH_2)_7COOH$$

For example, the additive organic compound of the fuel composition may include a dimethyl ether. For the purpose of this disclosure, a dimethyl ether is intended to describe an organic compound commonly found as a colorless gas with uses as a biofuel. Dimethyl ether may be derived from lignocellulosic biomass, biogas, methane from organic waste, shale gas, natural gas, and other sources. Dimethyl ether is typically flammable. In at least one embodiment, the dimethyl ether may be alternatively labeled as methoxymethane and may be described by the formula:

$$CH_3OCH_3 \text{ or } C_2H_6O$$

For example, the additive organic compound of the fuel composition may include an alcohol. For the purpose of this disclosure, an alcohol is intended to describe virtually any organic compound with a hydroxyl functional group bound to a carbon atom. In its broadest application, the alcohol includable in the additive organic compound may be a monohydric alcohol, a polyhydric alcohol, an unsaturated aliphatic alcohol, an alicyclic alcohol, or another alcohol that would be apparent to a person of skill in the art after having the benefit of this disclosure.

In at least one embodiment, the alcohol includable as or in the additive organic compound may include an ethanol. For the purpose of this disclosure, ethanol is intended to describe a monohydric alcohol, which may be characteristic of an ethyl group linked to a hydroxyl group. Alternatively, the ethanol may be referred to as ethyl alcohol, EtOH, ethyl hydroxide, grain alcohol, drinking alcohol, or more generally, alcohol. Ethanol may be derived from fermentation of sugars and starches by yeast, petrochemical processes, or other sources. Ethanol is flammable. In at least one embodiment, ethanol may be described by the formula:

$$C_2H_5OH \text{ or } CH_3-CH_2-OH \text{ or } C_2H_6O$$

With these ingredients considered, the fuel composition may benefit from improved fuel, heating, and safety characteristics over traditional fuels. In the interest of clearly illustrating a fuel composition enabled by this disclosure, an illustrative fuel including hexane, acetone, and optionally one or more additive organic compounds will now be discussed without limitation. Those of skill in the art will appreciate additional fuel compositions that can be created to be consistent with the scope and spirit of this disclosure and should not view any invention described by this disclosure to be limited to only the example provided below.

An example fuel composition will now be described without limitation. The example fuel composition may include a mixture with hexane as a base hydrocarbon with additives and can be used as a fuel in homes, industrial kilns, automotive sector, power generation, and other applications. Acetone may be mixed with the hexane. Additional mixtures may additionally include ethanol and/or other additives. In this example, hexane may be the principal constituent and the other primary organic compounds and additive organic compounds may be included with very low percentages.

Due to its composition, the example fuel composition is unique and can be transported and stored as a liquid. When released, this example fuel composition may vaporize and burn as a controlled gas. Also, the example fuel composition can be changed from either liquid state or gas state with relative ease. The ability to easily shift between phases greatly advantages the example fuel composition for transferring of liquefied gases from one container to another.

The example fuel composition may be stored in a substantially enclosed container under pressure or virtually zero pressure. The example fuel composition stored in the container may be maintained in state of substantial equilibrium with the gas vapors on top of the liquid providing the tank pressure to keep the liquid fuel composition from boiling. The specific gravities of the liquids may be just over half that of water, wherein a gallon of the example fuel composition may weigh only about half the weight of a gallon of water.

Also, the example fuel composition may have a viscosity of approximately about 0.1 cp, which is about 10 times thinner than the viscosity of water. This property advantageously makes the example fuel composition an easy fluid to vaporize.

In the example fuel composition, the included acetone and hexane have been characterized by different boiling points. For the purpose of this disclosure, boiling point means the temperature at which each liquid will vaporize. For example, hexane may boil at approximately 68° C. and acetone may boil at approximately 50° C. at atmospheric pressure. Therefore, hexane may resist vaporization at atmospheric pressure while acetone may experience vaporization. Experimentation performed on the example fuel composition confirmed that a hexane-acetone combination formula attained vaporization properties while retaining the desired concentration of acetone vapors compared with hexane vapors. Thus, at virtually any given temperature, the pressure for an acetone vessel will be higher than a hexane vessel, making the example fuel composition a substantially, inherently safe fuel. Prime factors contribute to the example fuel composition increased safety properties include (1) its narrow limits of flammability, and (2) being stored in a substantially leak-proof container.

When including additives, such as the additive organic compounds discussed above, with the example fuel composition, additional unique characteristics are achieved. For example, additional features and characteristics include: (1) substantial disintegration of the molar masses enabling the vapors to pass through, (2) maintenance of the temperature of the fuel in the container, (3) better quality and longer shelf life, (4) improved combustion control, (5) improved controlled rate of evaporation, and (6) improved stability of the liquid in the container.

Test show improved control of the limits of flammability compared to most traditional fuels in the present art. Tests additionally show that the example fuel composition is cleaner than petrol/gasoline, diesel, and liquid petroleum gases (LPG), at least partially because it is composed of predominantly simple compounds. Compared with emissions from stoves of petrol/gasoline and diesel, emissions from the example fuel composition showed lower levels of hydrocarbon compounds, nitrogen oxides, sulphur oxides, air toxics, and carbon monoxides.

The fluid regulation apparatus will now be discussed in greater detail. FIGS. 1-22 highlight examples of the fluid regulation apparatus, which may also be shown in other figures. The fluid regulation apparatus may include and may be alternatively referred to as an electronically controlled vapor flow regulation system, without limitation.

In one embodiment, the fluid regulation apparatus may create artificial pressure in a container, which may assist in producing a vapor from a fuel composition held by the container. The fluid regulation apparatus may induce a gas flow into the container containing the fuel formulation at a desired ratio. In one embodiment, the gas may substantially be or include vapors from within the container, without limitation. In another embodiment, the gas may include air drawn from outside of the container, without limitation. The ratio may be controlled at least by an electronic circuit. Vapor may be extracted at a desired flow rate.

The liquid fuel composition may be stored in the container in a substantially stable form, for example, when the fuel is not being drawn from the container by the fluid regulation apparatus. As a load or device consuming the fuel is enabled, such as a cooking or heating system is turned on, a motor of the fluid regulation apparatus may be enabled to direct a gas into the container. The gas may churn the fuel composition inciting a chemical reaction within the container. Vapors may be produced from the chemical reaction and directed to the load or device to consume the fuel composition. The rate of flow for the vapor may be controlled via an electronic circuit. The fluid exiting the fluid regulation apparatus may pass through a valve, such as through a triple non-return valve, (triple NRV). The vapors may be distributed for use. After burning, there may advantageously be minimal or zero residue left over in the connecting pipes.

The flow component will now be discussed in greater detail. FIGS. 1 and 7-8 highlight examples of the flow component 30, which may also be shown in other figures. In a general form, the flow component 30 may include a device to direct a gas from a source location to a desire location. The source location may be outside of the flow component 30, outside of the fluid regulation component 2, from with a container, or elsewhere as will be appreciated by those of skill in the art.

One or more aspects of the flow component 30 may be driven by a motor 20. For example, the motor 20 may include a motor impeller shaft receiver 22, into which an impeller shaft 48 may be received. The motor may rotate an object received by the impeller shaft receiver 22, such as the impeller shaft 48, to affect operation of the flow component 30. In one embodiment, the motor 20 may be a silent micro-motor assembly kit. The motor 20 may be activated and/or controlled by an electronic controller to direct the flow of gas into the container, which may create a pressure promoting flow of a vapor.

In the interest of clearly illustrating the flow component 30, an example flow component 30 is shown in FIGS. 7-8. The example flow component 30 may include a flow housing 34 and an impeller 40. The flow housing 34 may be configured to direct the flow of a gas moved by the impeller 40. The flow housing 34 may additionally include a flow inlet aperture 32 to receive the gas to be directed, a flow housing shaft aperture 36 through which an impeller shaft 48 may pass, a flow outlet aperture 38 from which the directed gas may be expelled, and other features.

An impeller 40 may be installed into the flow housing 34 of the flow component 30. The impeller 40 may include an impeller base 44 from which one or more impeller fins 46 may be outwardly extended. In one example, multiple impeller fins 46 may be extended from the impeller base 44. An impeller shaft 48 may be installed to the impeller base 44 such that rotation of the impeller shaft 48 translates to rotation of the impeller base 44. The impeller shaft 48 may be passed at least partially through the flow housing shaft aperture 36, where it may be received by the motor impeller shaft receiver 22 of the motor 20.

The regulator covers will now be discussed in greater detail. FIGS. 1-5 and 9-12 highlight examples of the regulator covers, including the regulator top cover 10 and regulator bottom cover 50, which may also be shown in other figures. The regulator top cover 10 may be operationally installed to the regulator bottom cover 50 to create the regulator cover. At least part of the motor 20, flow component 30, and other components may be at least partially enclosed by the regulator cover. Embodiments of the regulator top cover 10, regulator bottom cover 50, and other aspects of the regulator cover will now be discussed below in the interest of clarity and without limitation.

Figure 5:
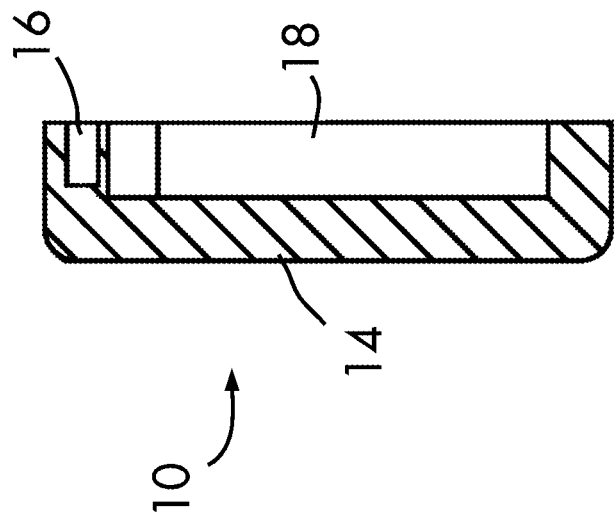
FIGS. 5-6 are sectional views of a regulator top cover, according to an embodiment of this disclosure.
Figure 4:
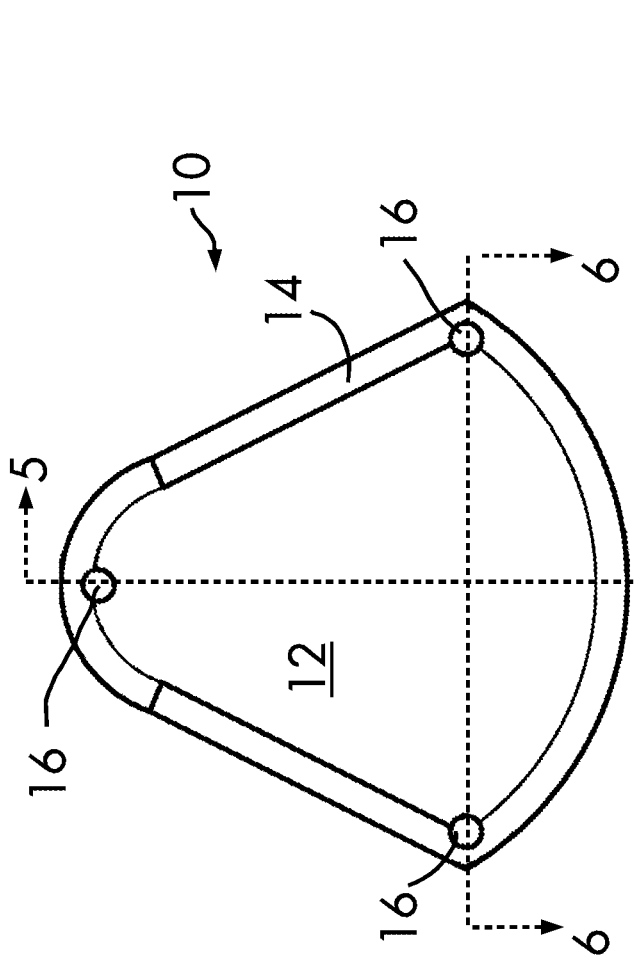
FIG. 4 is a top plan view of a regulator top cover, according to an embodiment of this disclosure.
Figure 6:
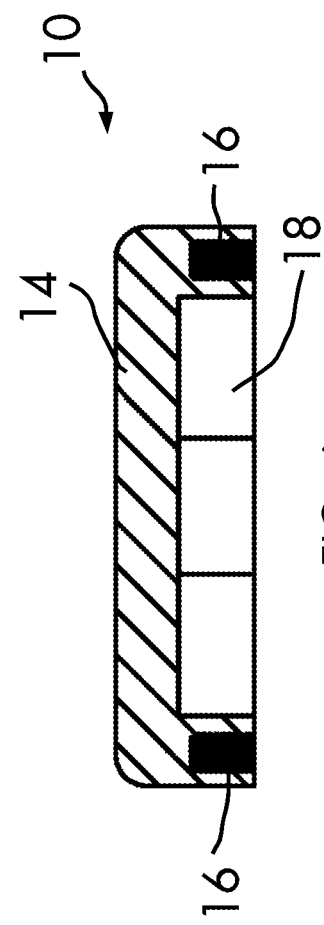
Figure 11:
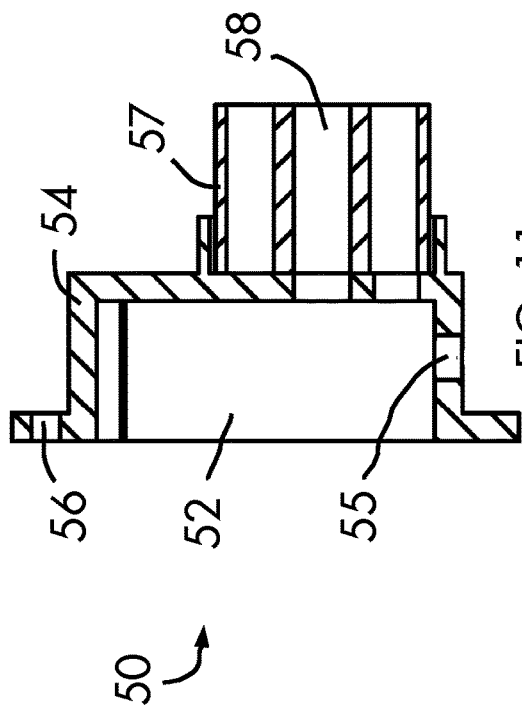
FIGS. 11-12 are sectional views of a regulator bottom cover, according to an embodiment of this disclosure.
Figure 9:
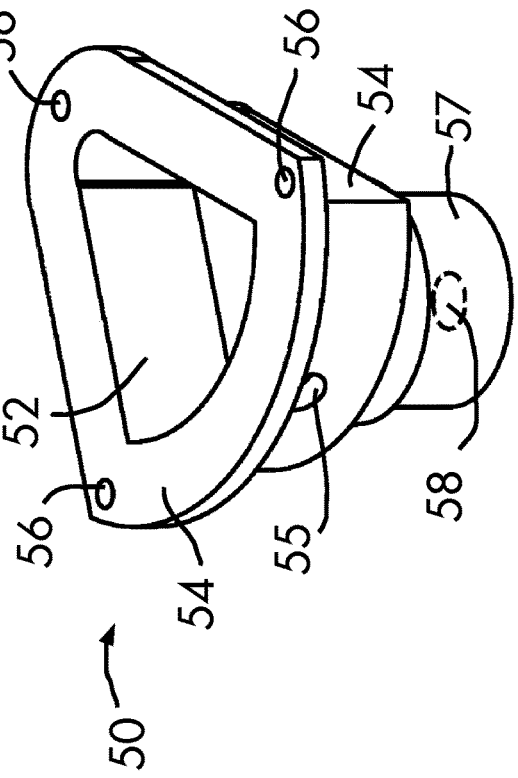
FIG. 9 is a perspective view of a regulator bottom cover, according to an embodiment of this disclosure.
Figure 10:
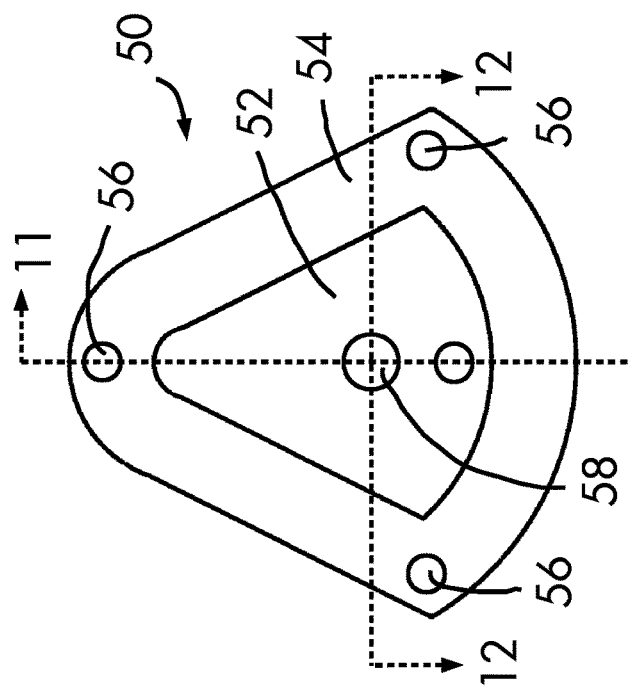
FIG. 10 is a top plan view of a regulator bottom cover, according to an embodiment of this disclosure.
Figure 12:
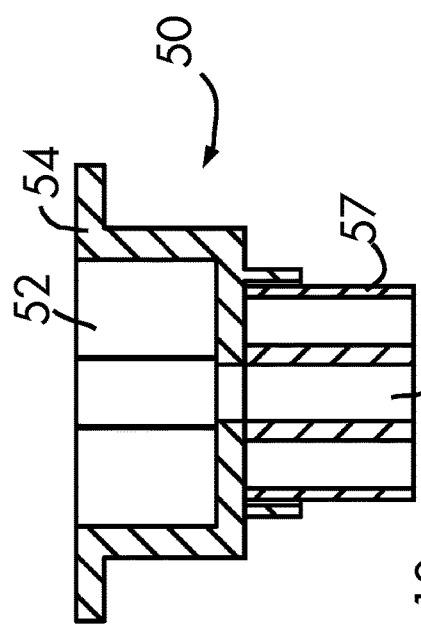
Figure 13:
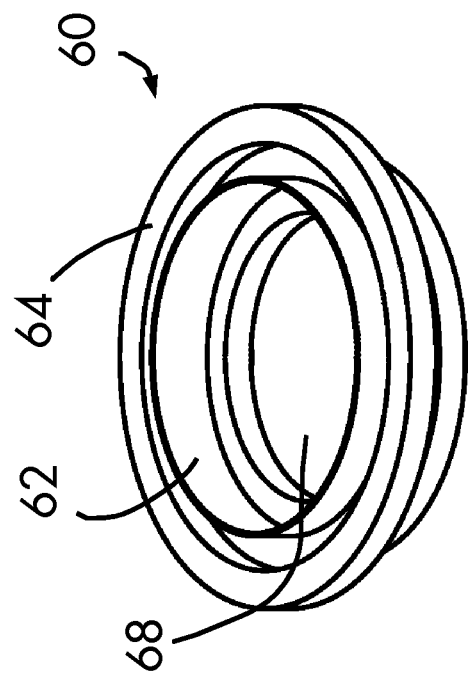
FIG. 13 is a perspective view of a roller clip mechanism, according to an embodiment of this disclosure.
Figure 14:
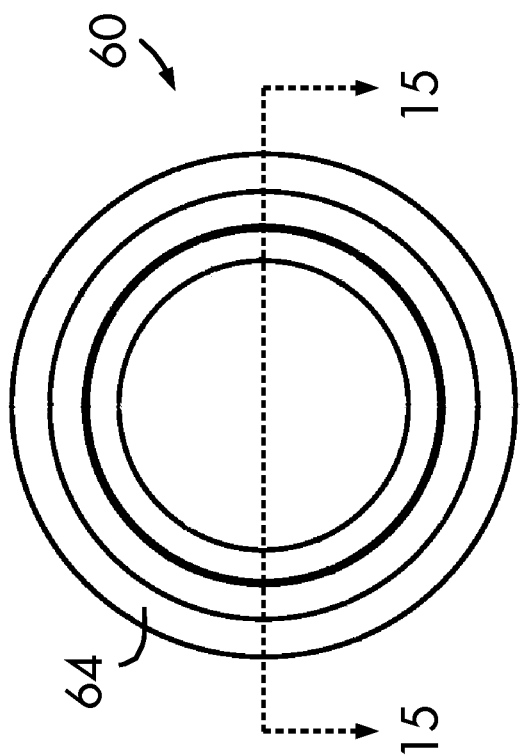
FIG. 14 is a top plan view of a roller clip mechanism, according to an embodiment of this disclosure.
Figure 15:
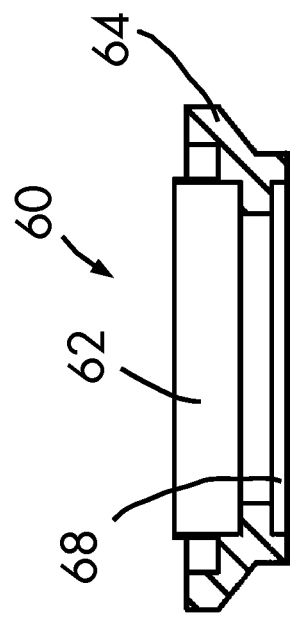
FIG. 15 is a sectional view of a roller clip mechanism, according to an embodiment of this disclosure.
Figure 16:
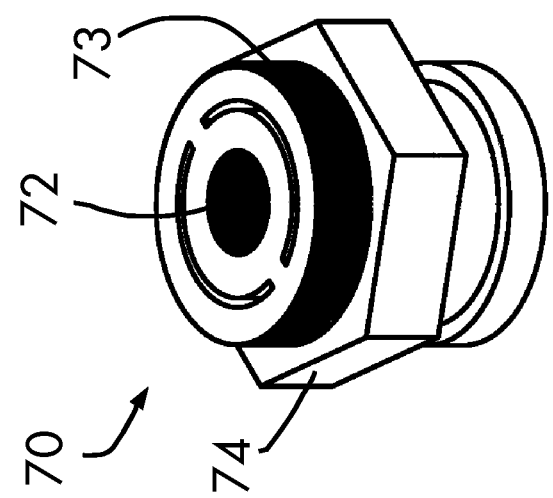
FIG. 16 is a perspective view of a filling head, according to an embodiment of this disclosure.
Figure 17:
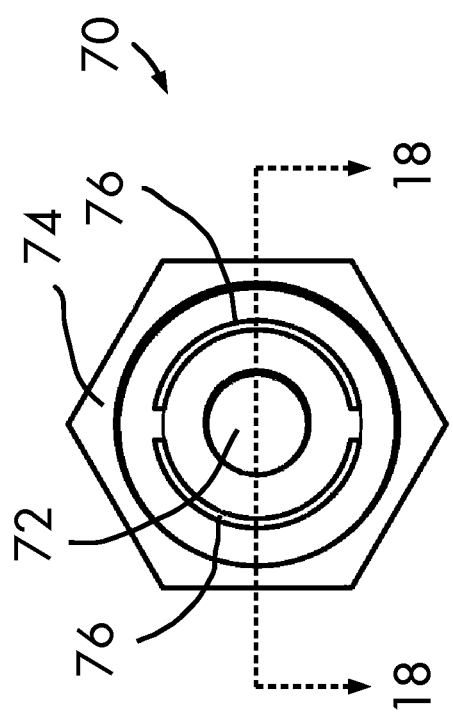
FIG. 17 is a top plan view of a filling head, according to an embodiment of this disclosure.
Figure 18:
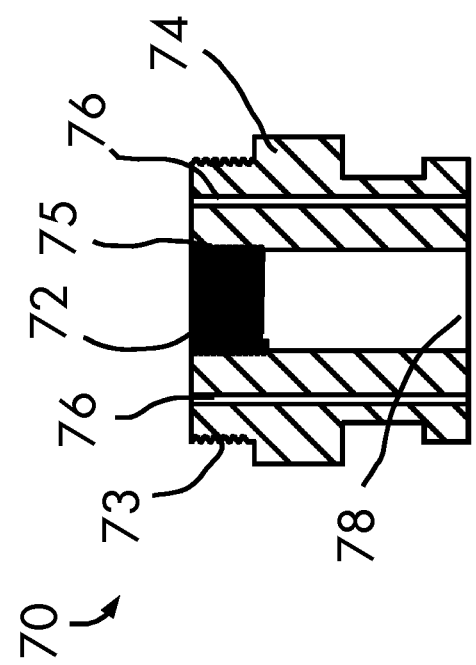
FIG. 18 is a sectional view of a filling head, according to an embodiment of this disclosure.
Figure 19:
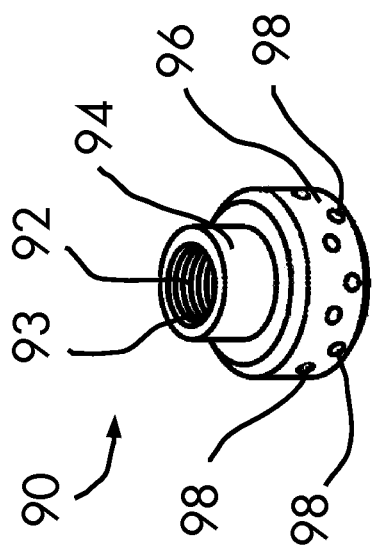
FIG. 19 is a perspective view of a distributor, according to an embodiment of this disclosure.
Figure 20:
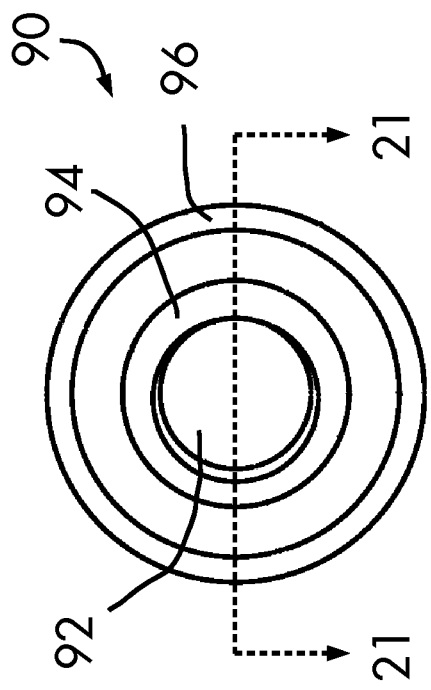
FIG. 20 is a top plan view of a distributor, according to an embodiment of this disclosure.
Figure 21:
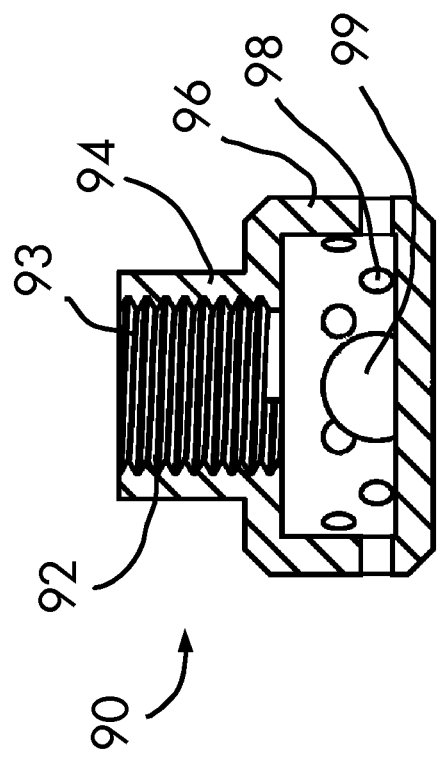
FIG. 21 is a sectional view of a distributor, according to an embodiment of this disclosure.

An illustrative regulator top cover 10 will now be discussed along with FIGS. 4-6. The illustrative regulator top cover 10 may include an outward facing regulator top cover top surface 12, which may provide a top portion of the fluid regulation apparatus 2. The regulator top cover 10 may include one or more regulator top cover side walls 14 extending outwardly from the regulator top cover top surface 12, for example, in an orthogonal direction.

The regulator top cover 10 may include one or more regulator top cover mounting hardware receivers 16, into which hardware may be received to mount the regulator top cover 10 to the regulator bottom cover 50. The regulator top cover mounting receivers 16 may include a threading on an inner surface, facilitating the receipt of threaded hardware.

The regulator top cover 10 may include a regulator top cover bottom opening 18, which may provide an interior space into which other components may be installed or covered, for example, the motor 20, flow component 30, electronic controller, and other components.

An illustrative regulator bottom cover 50 will now be discussed along with FIGS. 9-12. The illustrative regulator bottom cover 50 may include an inward facing regulator bottom cover top opening 52, which may provide a space into which additional components may be installed or located, for example, the motor 20, flow component 30, electronic controller, and other components.

The regulator bottom cover 50 may include a regulator bottom cover upper section 54 and a regulator bottom cover lower section 57. The regulator bottom cover upper section 54 may include the space accessible from the regulator bottom cover top opening 52. One or more regulator bottom cover mounting hardware apertures 56 may be located on the regulator bottom cover upper section 54, for example, to facilitate installation of the regulator bottom cover 50 to the regulator top cover 10 via hardware. For example, threaded hardware may be passed through the regulator bottom cover mounting hardware aperture 56 and received by the regulator top cover mounting hardware receiver 16 to install the regulator top cover 10 to the regulator bottom cover 50.

The regulator bottom cover lower section 57 may include access to a regulator bottom cover bottom opening 58, through which a gas or other fluid may be passed. For example, a gas directed by a flow component 30 installed into the space provided by the regulator bottom over upper section 54 may be directed through the regulator bottom cover lower section 57 where it may exit from the regulator bottom cover bottom opening 58.

The regulator bottom cover 50 may include a regulator outlet aperture 55. For example, vapors produce by the fluid regulation apparatus 2 may be exhausted from the fluid regulation apparatus 2 via the regulator outlet aperture 55. While the shown example depicts the regulator outlet aperture 55 being located on the regulator bottom cover 50, skilled artisans will appreciate alternative embodiments with the regulator outlet aperture 55 located elsewhere while retaining its utility.

A valve may be installed to control the flow of vapor. In one embodiment, the valve may be installed to the regulator outlet aperture 55. In some embodiments, the valve may be virtually any type of valve capable of affecting the flow of a fluid. In at least one embodiment, the valve may be a uniquely designed triple non-return valve capable of controlling flow ratios of gas and vapor.

The valve may also include an energy conversion device to convert the kinetic energy of passing vapor into electrical energy that can charge a battery. As will be discussed below, one or more components of the fluid regulatory apparatus 2 may be powered by a battery, for example, the electronic controller. An example of an energy conversion device may include a turbine-driven generator, without limitation. Voltage regulation may be handled by the electronic controller, a separate controller, or another device that would be apparent to a person of skill in the art after having the benefit of this disclosure.

The roller clip mechanism will now be discussed in greater detail. FIGS. 1-3 and 13-15 highlight examples of the roller clip mechanism 60, which may also be shown in other figures. The roller clip mechanism 50 may include a roller clip mechanism top opening 62 and a roller clip mechanism bottom opening 68. A roller clip mechanism sidewall 64 may extend from the roller clip mechanism top opening 62 to the roller clip mechanism bottom opening 68, through which a gas directed by the flow component 30 may pass. The roller clip mechanism 60 may include a unique roller cache system to lock connected components of the fluid regulator apparatus 2 to a filling head 70 installable to a container.

The filling head will now be discussed in greater detail. FIGS. 1-3 and 16-18 highlight examples of the filling head 70, which may also be shown in other figures. The filling head 70 may include a filling head top opening 72 and a filling head bottom opening 78. A filling head sidewall 74 may extend from the filling head top opening 72 to the filling head bottom opening 78, through which a gas directed by the flow component 30 may pass.

The filling head 70 may additionally include one or more filling head return channels 76 from which a gas from the container may be returned to the flow component 30. The inclusion of the filling head return channel 76 advantageously allows the liquid fuel composition inside the container to be agitated by the vapors created by the fuel composition.

The filling head 70 may include a filling head outer threading 73, which may facilitate installation of the filling head 70 to a container, to the roller clip mechanism 60, to the regulator bottom cover 50, and/or to elsewhere depending on the embodiment. Additionally, the filling head 70 may include a filling head inner threading 75 on an inner portion of the filling head sidewall 74, for example, to receive a feeder stem 80.

The feeder stem will now be discussed in greater detail. FIGS. 1-3 highlight examples of the feeder stem 80, which may also be shown in other figures. The feeder stem 80 may be provided by an elongated pipe, tube, or other hollowed structure through which a fluid may pass. The feeder stem 80 may include a feeder stem top end 82 that may include a feeder stem top threading 83 and a distal feeder stem bottom end 88 that may include a feeder stem bottom threading 87. The feeder stem top end 83 may be received by the filling head 70, for example, via the threading. The feeder stem bottom end 88 may be received by a distributor, for example, via the threading.

The distributor will now be discussed in greater detail. FIGS. 1-3 and 19-21 highlight examples of the distributor 90, which may also be shown in other figures. The distributor 90 may include a distributor upper section 94 and a distributor lower section 96. The distributor 90 may include a distributor top opening 92, for example, in the distributor upper section 94. Distributor inner threading 93 may be included within an interior surface of the distributor top section 94, which may receive a feeder stem 80.

The distributor 90 may also include one or more distributor distribution apertures 98, for example, in the distributor lower section 96. A distributor ball 99 may also be included in the distributor lower section to assist with directing the gas received by the distributor 90 to multiple distributor distribution apertures 98. The distributor 90 may be at least partially submerged into the fuel composition held by a container. Gas exhausted through the distributor 90 may pass through and/or agitate the fuel composition, inciting a chemical reaction the releases vapors.

The electronic controller will now be discussed in greater detail. FIGS. 1 and 7-8 highlight examples of the electronic controller, which may also be shown in other figures. The electronic controller may be operatively connected to one or more sensors that may detect a condition. For example, the electronic controller may be connected to a sensor capable of determining the pressure within the interior of a container. Pressure sensors may include a transducer, for example. Readings from the sensor may be stored by memory of the electronic controller as a detected pressure. These detected pressures may be compared to a target pressure stored in the memory to determine whether the pressures are within an acceptable level of compliance according to one or more rules.

In one example operation, the electronic controller may affect the operation of the motor via sensing of a detected pressure and following rules to at least partially reach a target pressure. The operation may include accessing a target pressure stored in a memory of the electronic controller to define the rule. The sensor may then determine the detected pressure within the container. The detected pressure may be compared with the target pressure to determine compliance with the rule. If it is determined that sufficient compliance with the rule is not met, the motor may be enabled or maintained in an enabled state to affect the pressure. This enabled state may agitate the fuel composition by introducing bubbles, small ripples, or other features to incite the release of vapor. If it is determined that sufficient compliance with the rule is met, the motor may be disabled or maintained in a disabled state to essentially maintain pressure. This disabled state may assist with residue settling back into the container and/or as a liquid state.

Inclusion of the electronic controller may advantageously measure and/or affect a rate of gas flow into the container, rate of vapor discharge from the fluid regulation apparatus, provide power supply and control to the electronic components, manage substantially automated recharge of a battery and other components, facilitate a molar mass disintegration procedure, be optionally operated remotely or wirelessly, and/or enhance the stability of the liquid fuel composition in the container.

Figure 22:
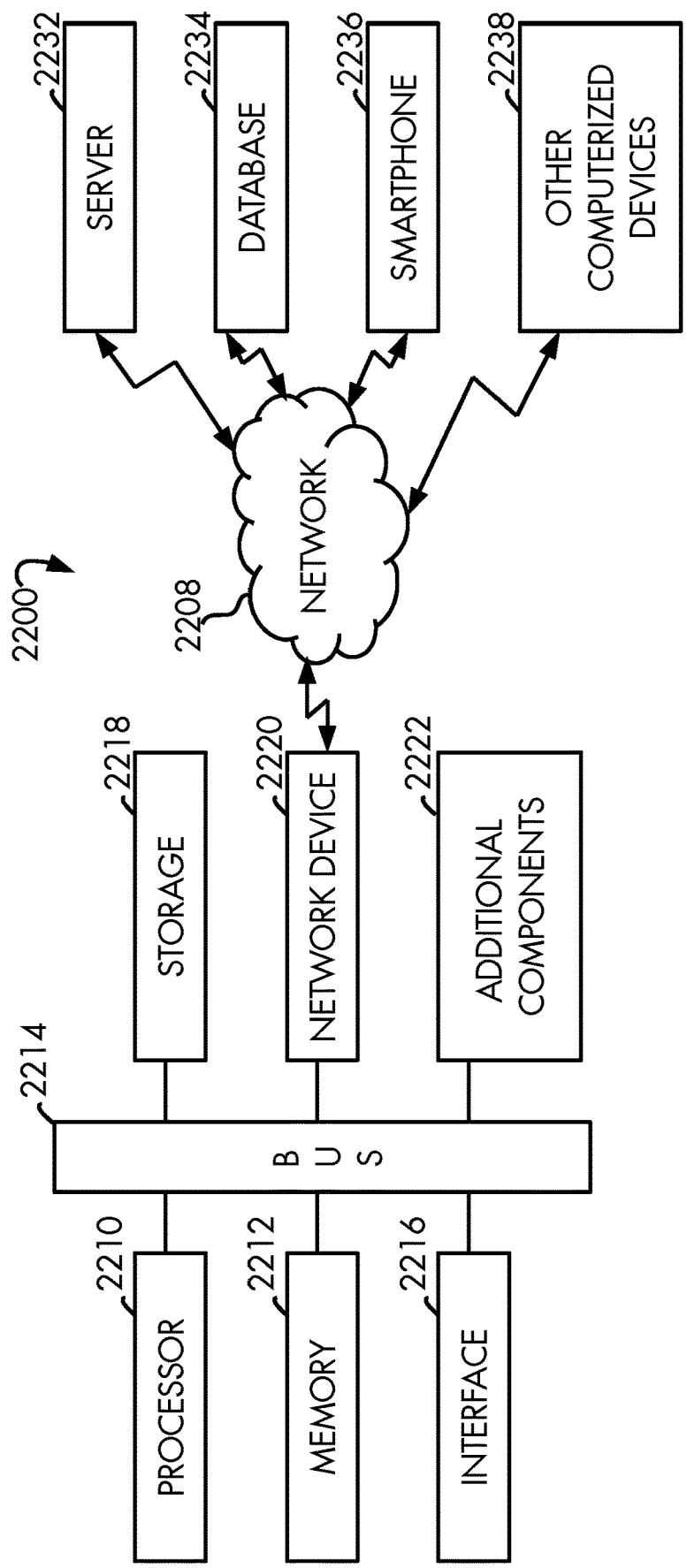
FIG. 22 is a block diagram view of a computerized device, according to an embodiment of this disclosure.

Referring now to FIG. 22, an illustrative computerized device will be discussed that may be used for or in association with the electronic controller, without limitation. Various aspects and functions described in accord with the present disclosure may be implemented as hardware or software on one or more illustrative computerized devices 2200 or other computerized devices. There are many examples of illustrative computerized devices 2200 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 2200 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 2200, among others. Additionally, aspects in accord with the present disclosure may be located on a single illustrative computerized device 2200 or may be distributed among one or more illustrative computerized devices 2200 connected to one or more communication networks.

For example, various aspects and functions may be distributed among one or more illustrative computerized devices 2200 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 22 shows a block diagram of an illustrative computerized device 2200, in which various aspects and functions in accord with the present disclosure may be practiced. The illustrative computerized device 2200 may include one or more illustrative computerized devices 2200. The illustrative computerized devices 2200 included by the illustrative computerized device may be interconnected by, and may exchange data through, a communication network 2208. Data may be communicated via the illustrative computerized device using a wireless and/or wired network connection.

Network 2208 may include any communication network through which illustrative computerized devices 2200 may exchange data. To exchange data via network 2208, systems and/or components of the illustrative computerized device 2200 and the network 2208 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 2200 may transmit data via the network 2208 using a variety of security measures including TSL, SSL, or VPN, among other security techniques. The illustrative computerized device 2200 may include any number of illustrative computerized devices 2200 and/or components, which may be networked using virtually any medium and communication protocol or combination of protocols.

Various aspects and functions in accord with the present disclosure may be implemented as specialized hardware or software executing in one or more illustrative computerized devices 2200, including an illustrative computerized device 2200 shown in FIG. 22. As depicted, the illustrative computerized device 2200 may include a processor 2210, memory 2212, a bus 2214 or other internal communication system, an input/output (I/O) interface 2216, a storage system 2218, and/or a network communication device 2220. Additional devices 2222 may be selectively connected to the computerized device via the bus 2214. Processor 2210, which may include one or more microprocessors or other types of controllers, can perform a series of instructions that result in manipulated data. Processor 2210 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 2210 may be connected to other system elements, including a memory 2212, by bus 2214.

The illustrative computerized device 2200 may also include a network communication device 2220. The network communication device 2220 may receive data from other components of the computerized device to be communicated with servers 2232, databases 2234, smart phones 2236, and/or other computerized devices 2238 via a network 2208. The communication of data may optionally be performed wirelessly. More specifically, without limitation, the network communication device 2220 may communicate and relay information from one or more components of the illustrative computerized device 2200, or other devices and/or components connected to the computerized device 2200, to additional connected devices 2232, 2234, 2236, and/or 2238. Connected devices are intended to include, without limitation, data servers, additional computerized devices, mobile computing devices, smart phones, tablet computers, and other electronic devices that may communicate digitally with another device. In one example, the illustrative computerized device 2200 may be used as a server to analyze and communicate data between connected devices.

The illustrative computerized device 2200 may communicate with one or more connected devices via a communications network 2208. The computerized device 2200 may communicate over the network 2208 by using its network communication device 2220. More specifically, the network communication device 2220 of the computerized device 2200 may communicate with the network communication devices or network controllers of the connected devices. The network 2208 may be, for example, the internet. As another example, the network 2208 may be a WLAN. However, skilled artisans will appreciate additional networks to be included within the scope of this disclosure, such as intranets, local area networks, wide area networks, peer-to-peer networks, and various other network formats. Additionally, the illustrative computerized device 2200 and/or connected devices 2232, 2234, 2236, and/or 2238 may communicate over the network 2208 via a wired, wireless, or other connection, without limitation.

Memory 2212 may be used for storing programs and/or data during operation of the illustrative computerized device 2200. Thus, memory 2212 may be a relatively high performance, volatile, random access memory such as a dynamic random-access memory (DRAM) or static memory (SRAM). However, memory 2212 may include any device for storing data, such as a disk drive or other non-volatile storage device. Various embodiments in accord with the present disclosure can organize memory 2212 into particularized and, in some cases, unique structures to perform the aspects and functions of this disclosure.

Components of illustrative computerized device 2200 may be coupled by an interconnection element such as bus 2214. Bus 2214 may include one or more physical busses (for example, busses between components that are integrated within a same machine) but may include any communication coupling between system elements including specialized or standard computing bus technologies such as USB, Thunderbolt, SATA, FireWire, IDE, SCSI, PCI and InfiniBand. Thus, bus 2214 may enable communications (for example, data and instructions) to be exchanged between system components of the illustrative computerized device 2200.

The illustrative computerized device 2200 also may include one or more interface devices 2216 such as input devices, output devices and combination input/output devices. Interface devices 2216 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 2216 allow the illustrative computerized device 2200 to exchange information and communicate with external entities, such as users and other systems.

Storage system 2218 may include a computer readable and writeable nonvolatile storage medium in which instructions can be stored that define a program to be executed by the processor. Storage system 2218 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk or flash memory, among others. In operation, processor 2210 or some other controller may cause data to be read from the nonvolatile recording medium into another memory, such as the memory 2212, that allows for faster access to the information by the processor than does the storage medium included in the storage system 2218. The memory may be located in storage system 2218 or in memory 2212. Processor 2210 may manipulate the data within memory 2212, and then copy the data to the medium associated with the storage system 2218 after processing is completed. A variety of components may manage data movement between the medium and integrated circuit memory element and does not limit the disclosure. Further, the disclosure is not limited to a particular memory system or storage system.

Although the above described illustrative computerized device is shown by way of example as one type of illustrative computerized device upon which various aspects and functions in accord with the present disclosure may be practiced, aspects of the disclosure are not limited to being implemented on the illustrative computerized device 2200 as shown in FIG. 22. Various aspects and functions in accord with the present disclosure may be practiced on one or more computers having a or components than that shown in FIG. 22. For instance, the illustrative computerized device 2200 may include specially-programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 2200 may include an operating system that manages at least a portion of the hardware elements included in illustrative computerized device 2200. A processor or controller, such as processor 2210, may execute an operating system which may be, among others, an operating system, one of the above-mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together define a computing platform for which application programs in high-level programming languages may be written. These component applications may be executable, intermediate (for example, C # or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C #, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

In operation, a method may be provided for an improved fuel composition. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

A method may be provided for controlling creation of a vapor using a fluid regulation apparatus. The method may include: (a) installing the fluid regulation apparatus to a container, the fluid regulation apparatus including an impeller located substantially within an interior volume of a flow component, a motor operatively connected to the impeller via an impeller shaft to rotate the impeller, an electronic controller to affect operation of the motor by analyzing a condition detected by a sensor operatively connected to the electronic controller, a regulator outlet aperture, a feeder stem installable to a container to direct a gas expelled from the flow component, and a distributor operatively connected to the feeder stem to distribute the gas received from the feeder stem.

The method may also include (b) affecting operation of the motor via the electronic controller by performing the steps: (i) accessing a target pressure stored in a memory of the electronic controller to define a rule, (ii) determining via the sensor a detected pressure within the container, (iii) comparing the detected pressure with the target pressure to determine compliance with the rule, (iv) enabling the motor for the detected pressure not substantially in compliance with the rule, and (v) disabling the motor for the detected pressure substantially in compliance with the rule.

The method may also include (c) if the motor is enabled, flowing the gas through the distributor to at least partially agitate the fluid. The method may also include (d) inciting a chemical reaction to create a vapor from the fluid via the agitation. The method may also include (e) extracting the vapor from the container via the regulator outlet aperture. The method may include (f) controlling flow of the vapor from the regulator outlet aperture via a valve. The method may include (g) at least partially powering the electronic controller by a battery; and (f) at least partially converting kinetic energy of the vapor into electrical energy storable in the battery.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A fluid regulation apparatus comprising:
    an impeller located within an interior volume of a flow component;
    a motor operatively connected to the impeller via an impeller shaft to rotate the impeller;
    an electronic controller to affect operation of the motor by analyzing a condition detected by a sensor operatively connected to the electronic controller;
    a regulator outlet aperture;
    a feeder stem to direct a gas expelled from the flow component; and
    a distributor operatively connected to the feeder stem to distribute the gas received from the feeder stem.

2. The fluid regulation apparatus of claim 1, further comprising:
    a regulator top cover; and
    a regulator bottom cover;
    wherein the flow component is at least partially enclosed by the regulator top cover and the regulator bottom cover.

3. The fluid regulation apparatus of claim 1, further comprising:
    a filling head operatively connected to the feeder stem.

4. The fluid regulation apparatus of claim 3, further comprising:
    a roller clip mechanism operatively connected to the filling head;
    wherein a vapor expelled from a container passes through the filling head to the regulator outlet aperture; and
    wherein the roller clip mechanism is removably locked to the filling head that is installed to the container.

5. The fluid regulation apparatus of claim 4:
wherein the feeder stem comprises:
a feeder stem top end for installation to the filling head, and
a feeder stem bottom end distal to the feeder stem top end for installation to the distributor; and
wherein the gas passes through the feeder stem between the filling head and the distributor.

6. The fluid regulation apparatus of claim 5:
wherein the feeder stem top end comprises a feeder stem top threading;
wherein the feeder stem bottom end comprises a feeder stem bottom threading;
wherein the filling head comprises a filling head inner threading to at least partially receive the feeder stem via the feeder stem top threading; and
wherein the distributor comprises a distributor inner threading to at least partially receive the feeder stem via the feeder stem bottom threading.

7. The fluid regulation apparatus of claim 1:
wherein the electronic controller affects the operation of the motor via:
(1) accessing a target pressure stored in a memory of the electronic controller to define a rule,
(2) determining via the sensor a detected pressure within a container,
(3) comparing the detected pressure with the target pressure to determine compliance with the rule,
(4) enabling the motor for the detected pressure not in compliance with the rule, and
(5) disabling the motor for the detected pressure in compliance with the rule.

8. The fluid regulation apparatus of claim 1:
wherein the distributor is at least partially submerged into a fluid within a container when installed to the container; and
wherein the gas flowed through the distributor at least partially agitates the fluid.

9. The fluid regulation apparatus of claim 8;
wherein agitation of the fluid incites a chemical reaction to create a vapor from the fluid; and
wherein the vapor is extracted from the container via the regulator outlet aperture.

10. The fluid regulation apparatus of claim 8, further comprising:
a valve to control flow of the vapor from the regulator outlet aperture.

11. The fluid regulation apparatus of claim 10, wherein the valve is a triple non-return valve.

12. The fluid regulation apparatus of claim 9, wherein the electronic controller is at least partially powered by a battery.

13. The fluid regulation apparatus of claim 12, wherein the battery is at least partially charged by converting kinetic energy of the vapor into electrical energy to be stored in the battery.

14. A fluid regulation apparatus comprising:
an impeller located within an interior volume of a flow component;
a motor operatively connected to the impeller via an impeller shaft to rotate the impeller;
an electronic controller to affect operation of the motor by analyzing a condition detected by a sensor operatively connected to the electronic controller;
wherein the electronic controller affects the operation of the motor via:
(a) accessing a target pressure stored in a memory of the electronic controller to define a rule,
(b) determining via the sensor a detected pressure within a container,
(c) comparing the detected pressure with the target pressure to determine compliance with the rule,
(d) enabling the motor for the detected pressure not in compliance with the rule, and
(e) disabling the motor for the detected pressure in compliance with the rule.

15. The fluid regulation apparatus of claim 14, further comprising:
a feeder stem to direct a gas expelled from the flow component;
a distributor operatively connected to the feeder stem to distribute the gas received from the feeder stem;
a filling head operatively connected to the feeder stem; and
a roller clip mechanism operatively connected to the filling head;
wherein the gas expelled from the flow component passes between the roller clip mechanism that is connected to the filling head and the filling head.

16. The fluid regulation apparatus of claim 15:
wherein the distributor is at least partially submerged into a fluid within the container when installed to the container;
wherein the gas flowed through the distributor at least partially agitates the fluid;
wherein agitation of the fluid creates a vapor from the fluid;
wherein the vapor is extracted from the container via a regulator outlet aperture; and
further comprising a valve to control flow of the vapor from the regulator outlet aperture.

17. The fluid regulation apparatus of claim 16:
wherein the electronic controller is at least partially powered by a battery; and
wherein the battery is at least partially charged by converting kinetic energy of the vapor into electrical energy to be stored in the battery.

18. A method for controlling creation of a vapor using a fluid regulation apparatus, the method comprising:
(a) installing the fluid regulation apparatus to a container, the fluid regulation apparatus comprising:
an impeller located within an interior volume of a flow component,
a motor operatively connected to the impeller via an impeller shaft to rotate the impeller,
an electronic controller to affect operation of the motor by analyzing a condition detected by a sensor operatively connected to the electronic controller,
a regulator outlet aperture, and
a distributor operatively connected to the flow component to distribute gas received from the flow component;
(b) affecting operation of the motor via the electronic controller by performing the steps:
(i) accessing a target pressure stored in a memory of the electronic controller to define a rule,
(ii) determining via the sensor a detected pressure within the container,
(iii) comparing the detected pressure with the target pressure to determine compliance with the rule,
(iv) enabling the motor for the detected pressure not in compliance with the rule, and (v) disabling the motor for the detected pressure in compliance with the rule;

(c) if the motor is enabled, flowing the gas through the distributor to at least partially agitate a fluid;

(d) inciting a chemical reaction to create a vapor from the fluid via agitation; and (e) extracting the vapor from the container via the regulator outlet aperture.

19. The method of claim 18, further comprising:

(f) controlling flow of the vapor from the regulator outlet aperture via a valve.

20. The method of claim 18, further comprising (g) at least partially powering the electronic controller by a battery; and (f) at least partially converting kinetic energy of the vapor into electrical energy to be stored in the battery.

\* \* \* \* \*